US007568295B1

(12) United States Patent  (10) Patent No.: US 7,568,295 B1
Strain  (45) Date of Patent: Aug. 4, 2009

(54) QUILT TOOL

(76) Inventor: Darline Strain, 22657 E. 855 Rd., Park Hill, OK (US) 74451

( * ) Notice: Subject to any disclaimer, the term of this patent is extended or adjusted under 35 U.S.C. 154(b) by 14 days.

(21) Appl. No.: 11/938,986

(22) Filed: Nov. 13, 2007

Related U.S. Application Data

(60) Provisional application No. 60/867,620, filed on Nov. 29, 2006.

(51) Int. Cl.
*G01B 3/14* (2006.01)
*A41H 3/00* (2006.01)
(52) U.S. Cl. .......................................... 33/566; 33/1 B
(58) Field of Classification Search ................... 33/566, 33/1 B, 1 G, 562, 563, 565
See application file for complete search history.

(56) References Cited

U.S. PATENT DOCUMENTS

| 183,076 | A | | 10/1876 | Somes | |
|---|---|---|---|---|---|
| 194,086 | A | | 8/1877 | Griffin | |
| 937,214 | A | | 10/1909 | Kellogg | |
| 1,473,241 | A | | 11/1923 | McCormick et al. | |
| 1,742,684 | A | | 1/1930 | Bowman | |
| 2,068,684 | A | | 1/1937 | Kravitz | |
| 4,945,642 | A | * | 8/1990 | Saulietis | ..................... 33/17 R |
| 5,201,783 | A | | 4/1993 | Peters | |
| 5,557,996 | A | * | 9/1996 | Reber et al. | ..................... 83/56 |
| 5,579,670 | A | | 12/1996 | McCormick | |
| 5,749,149 | A | * | 5/1998 | Claytor | ........................ 33/1 F |
| 5,791,062 | A | * | 8/1998 | Walker | ........................ 33/563 |
| 5,819,422 | A | * | 10/1998 | Schafer | ........................ 33/1 B |
| 6,158,135 | A | | 12/2000 | Rank | |
| 6,276,070 | B1 | * | 8/2001 | Hawley | ........................ 33/563 |
| 6,925,724 | B2 | | 8/2005 | Tandy | |
| 6,935,039 | B1 | | 8/2005 | Hess | |
| 7,100,295 | B1 | * | 9/2006 | Chang | ........................ 33/379 |
| 7,185,441 | B2 | * | 3/2007 | Lockyer | ...................... 33/562 |
| D549,115 | S | * | 8/2007 | Tucker | ........................ D10/64 |
| D577,617 | S | * | 9/2008 | Tucker | ........................ D10/64 |
| 2004/0163269 | A1 | * | 8/2004 | Brady | ........................ 33/562 |
| 2006/0032068 | A1 | * | 2/2006 | Sherman et al. | ................ 33/566 |
| 2007/0175052 | A1 | * | 8/2007 | Schafer et al. | ................ 33/1 B |

* cited by examiner

*Primary Examiner*—Christopher W Fulton
(74) *Attorney, Agent, or Firm*—Elizabeth D. Lewen, Esq.; Sherrill Law Offices, PLLC

(57) ABSTRACT

The quilting tool has a transparent, parallelogram plate and a first set of guidelines. The plate has at least a first major surface, a second major surface, a first side, a second side parallel to the first side, a third side and a fourth side parallel to the third side. The first set of guidelines has at least a plurality of individual guidelines imprinted on the first major surface of the plate. The individual guidelines are parallel to the first side of the plate and extend from the third side to the fourth side of the plate. The individual guidelines are spaced from the first side based on the equation (FB/NP)+(2×SA). FB is the finished block edge length. NP is the number of patches wanted along FB. SA is the seam allowance.

19 Claims, 7 Drawing Sheets

QUILT TOOL

This application claims the benefit of U.S. Provisional Application No. 60/867,620, filed Nov. 29, 2006.

BACKGROUND

Quilt making is a traditional art performed by many artisans. Quilts are traditionally made by precisely cutting pieces of fabric having different shape, color, design, and texture, then sewing the fabric pieces together to form a finished block having a particular design. The individual finished blocks are eventually sewn together according to a master design, which forms the cover of the quilt. While a completed quilt has practical applications in the home, very beautiful artistic designs are frequently employed in completing the finished quilt, thus, quilt making is considered an art form.

Ordinarily, geometric patterns are incorporated into the overall design of the quilt. Frequently, two different shapes are employed in creating the design, square and triangular. The angles and lengths of the individual square and triangular pieces must be sufficiently precise so that straight edges will eventually line up with other pieces of fabric at the proper angle in accord with the master design of the quilt.

Several possible solutions to this problem have been proposed. THE EASY ANGLE™ cutting guideline, distributed by Quilt House, Saddle Brook, N.J., is a transparent piece of plastic in the form of right triangle having gradated lines at crossing right angles to the right angle etched into its surface. The quilter using THE EASY ANGLE™ is limited by this device to making equilateral triangle shaped pieces. The TRI TOOL™ and RECS TOOL™, distributed by Quilt House, Saddle Brook, N.J., are also transparent plastic triangles having gradated lines etched into their surfaces. These tools have imprinted on their surfaces a series of parallel, gradated lines corresponding with the X-axis of the triangle. The TRI TOOL™ is used for cutting pieces to be arranged as triangles or triangles within squares having a height that is equal to the width of the base of the triangle. The RECS TOOL™ is used to cut pieces when finished to be used as 1×2 proportion triangles, having a height that is two times the width of the base of the triangle. Both the TRI TOOL™ and the RECS TOOL™, of necessity, come in a wide range of sizes. Perfect Patchwork Templates are distributed by Michell Marketing, Inc., and comprise a set of clear plastic pieces that are used as templates for cutting out a specifically sized and shaped piece of fabric. Perfect Patchwork Templates contain no gradated lines and are only used as outer templates for cutting out fabric pieces in different sizes and shapes. KALEIDO-GUIDELINE™ is distributed by Michell Marketing, Inc., Atlanta, Ga. and comprises a clear piece of plastic having a series of gradated lines etched into its surface. The angles represented by KALEIDO-GUIDELINE™ are peculiar to a "kaleidoscope" or pattern of radially arranged fabric pieces.

The devices discussed above all contain limitations making them difficult or inconvenient to use. As discussed, some of the devices, by their nature, require completely separate units to cut pieces of fabric having different sizes and angular configurations. The result of multiple devices of many sizes is that a number of devices decrease efficiency by occupying space, and, inevitably, some get lost. The one piece devices are generally limited to assisting in cutting out a single type of piece, requiring multiple units and resulting in similar problems as the single size units discussed above. The devices also require the process to start with the proper size strip of fabric requiring the user to mathematically determine the proper width of the finished block plus any seam allowances needed.

What is clearly needed is a single unit that combines the functions of a plurality of separate units, allows both square shaped blocks and triangular blocks with integrally attached seam allowances to be quickly and easily cut, and assures precise alignment of the pieces to form a finished block with a proper seam allowance and a proper edge length.

SUMMARY OF THE INVENTION

A first embodiment of the present invention is a quilting tool having a transparent, parallelogram plate and a first set of guidelines. The plate has at least a first major surface, a second major surface, a first side, a second side parallel to the first side, a third side and a fourth side parallel to the third side. The first set of guidelines has at least a plurality of individual guidelines imprinted on the first major surface of the plate. The individual guidelines are parallel to the first side of the plate and extend from the third side to the fourth side of the plate. The individual guidelines are spaced from the first side based on the equation $(FB/NP)+(2\times SA)$. FB is the finished block edge length. NP is the number of patches wanted along FB. SA is the seam allowance.

A second embodiment of the present invention is a quilting tool having a transparent, parallelogram plate and a second set of guidelines. The plate has at least a first major surface, a second major surface, a first side, a second side parallel to the first side, a third side and a fourth side parallel to the third side. The second set of guidelines has at least a plurality of individual guidelines imprinted on the first major surface of the plate. The individual guidelines are parallel to the third side of the plate and extend from the first side to the second side of the plate. The individual guidelines are spaced from the third side based on the equations (1) $[(FB/NP)+(2\times SA)]^2=R1$, (2) $[\sqrt{(R1\times 2)}]+(2\times SA)=R2$, and (3) $\sqrt{(R2^2/2)}$. FB is the finished block edge length. NP is the number of patches wanted along FB. SA is the seam allowance. R1 is the first result, and R2 is the second result.

A third embodiment of the present invention is a quilting tool having a transparent, parallelogram plate and a third set of guidelines. The plate has at least a first major surface, a second major surface, a first side, a second side parallel to the first side, a third side, and a fourth side parallel to the third side. The third set of guidelines has at least a plurality of individual guidelines imprinted on the first major surface of the plate. The individual guidelines are parallel to the second side of the plate and extend from the third side to the fourth side of the plate. The individual guidelines are spaced from the second side based on the equations (1) $[(FB/NP)+(2\times SA)]^2=R1$, (2) $[\sqrt{(R1\times 2)}]+(4\times SA)=R2$, and (3) $\sqrt{(R2^2/2)}$. FB is the finished block edge length. NP is the number of patches wanted along FB. SA is the seam allowance. R1 is the first result, and R2 is the second result.

DETAILED DESCRIPTION OF A PREFERRED EMBODIMENT

Definitions

Figure 1:
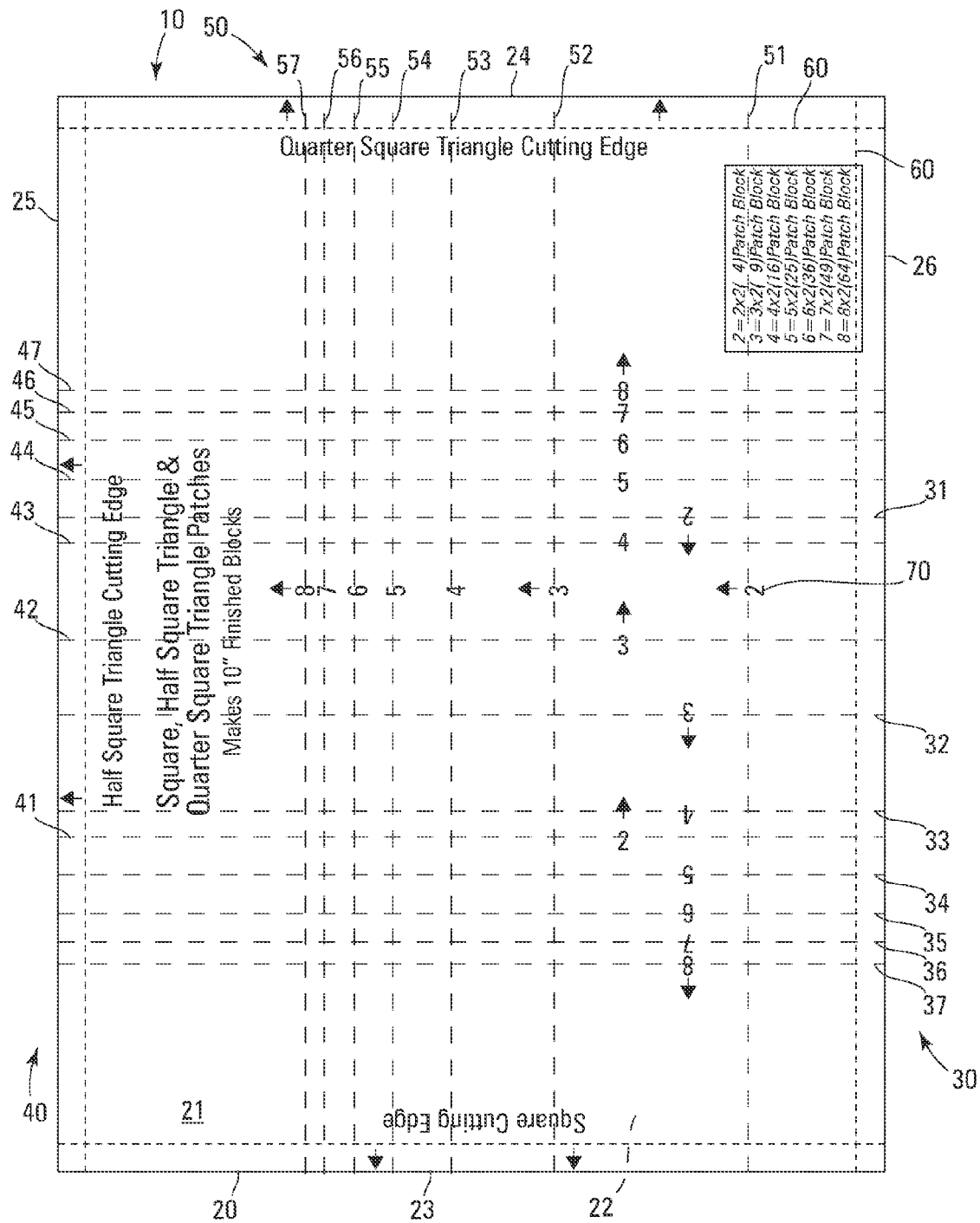
FIG. 1 is plan view of the first major surface of one embodiment of the quilting tool.

As utilized herein the phrase "Block," means an unfinished piece of fabric assembled from multiple patches of fabric that will later be sewn together with another block to form a quilt.

As utilized herein the phrase "Finished Block," means a block after it has been assembled with other blocks and all seam allowances have been used.

NOMENCLATURE

10 Quilting tool
20 Plate
21 First major surface
22 Second major surface
23 First side
24 Second side
25 Third side
26 Fourth side
30 First set of guidelines
31 First individual guideline
32 Second individual guideline
33 Third individual guideline
34 Fourth individual guideline
35 Fifth individual guideline
36 Sixth individual guideline
37 Seventh individual guideline
40 Second set of guidelines
41 First individual guideline
42 Second individual guideline
43 Third individual guideline
44 Fourth individual guideline
45 Fifth individual guideline
46 Sixth individual guideline
47 Seventh individual guideline
50 Third set of guidelines
51 First individual guideline
52 Second individual guideline
53 Third individual guideline
54 Fourth individual guideline
55 Fifth individual guideline
56 Sixth individual guideline
57 Seventh individual guideline
60 Seam allowance guideline
70 Alphanumeric characters
100 Piece of fabric
101 First Edge
102 Second Edge
110 Patch
120 Half Square triangle
130 Quarter square triangle
200 Block
210 Seam
300 Finished block
400 Quilt
FB Edge length of finished block
SA Seam allowance

Construction

A shown in FIG. 1, a first embodiment of the quilting tool 10 comprises a transparent, parallelogram plate 20 and a first set of guidelines 30. The plate 20 has a least a first major surface 21, a second major surface 22, a first side 23, a second side 24, a third side 25, and a fourth side 26. The first side 23 is parallel to the second side 24. The third side 25 is parallel to the fourth side 26.

The plate 20 may be made from any suitable transparent material such as glass or various kinds of plastic such as acrylic, polycarbonate, and polystyrene suitably rugged and rigid enough to withstand the rigors of a cutting means repeatedly contacting the first side 23, second side 24, third side 25, and fourth side 26. The preferred material is acrylic.

The plate 20 may be any suitable planar parallelogram shape. The preferred shapes are a square or rectangle and the most preferred shape is a rectangle. The plate 20 may have any suitable thickness. The preferred thickness is ⅛ inch.

The first set of guidelines 30 may be affixed to the first major surface 21 or second major surface 22 of the plate 20. The first set of guidelines 30 is preferably affixed to the first major surface 21 of the plate 20. The first set of guidelines 30 may be affixed to the plate 20 by any suitable means such as inking, etching, adhesive, chemical, or imprinting. The preferred method is imprinting.

The first set of guidelines 30 is parallel to the first side 23 and extends from proximate the third side 25 to the fourth side 26 of the plate 20. The first set of guidelines 30 is spaced from the first side 23 to allow the creation of square patches 110 to be used to form a block 200 with a given finished block 300 edge length FB. The first set of guidelines 30 is spaced from the first side 23 of the plate 20 based on the equation:

$$(FB/NP)+(2 \times SA)$$

Figure 2:
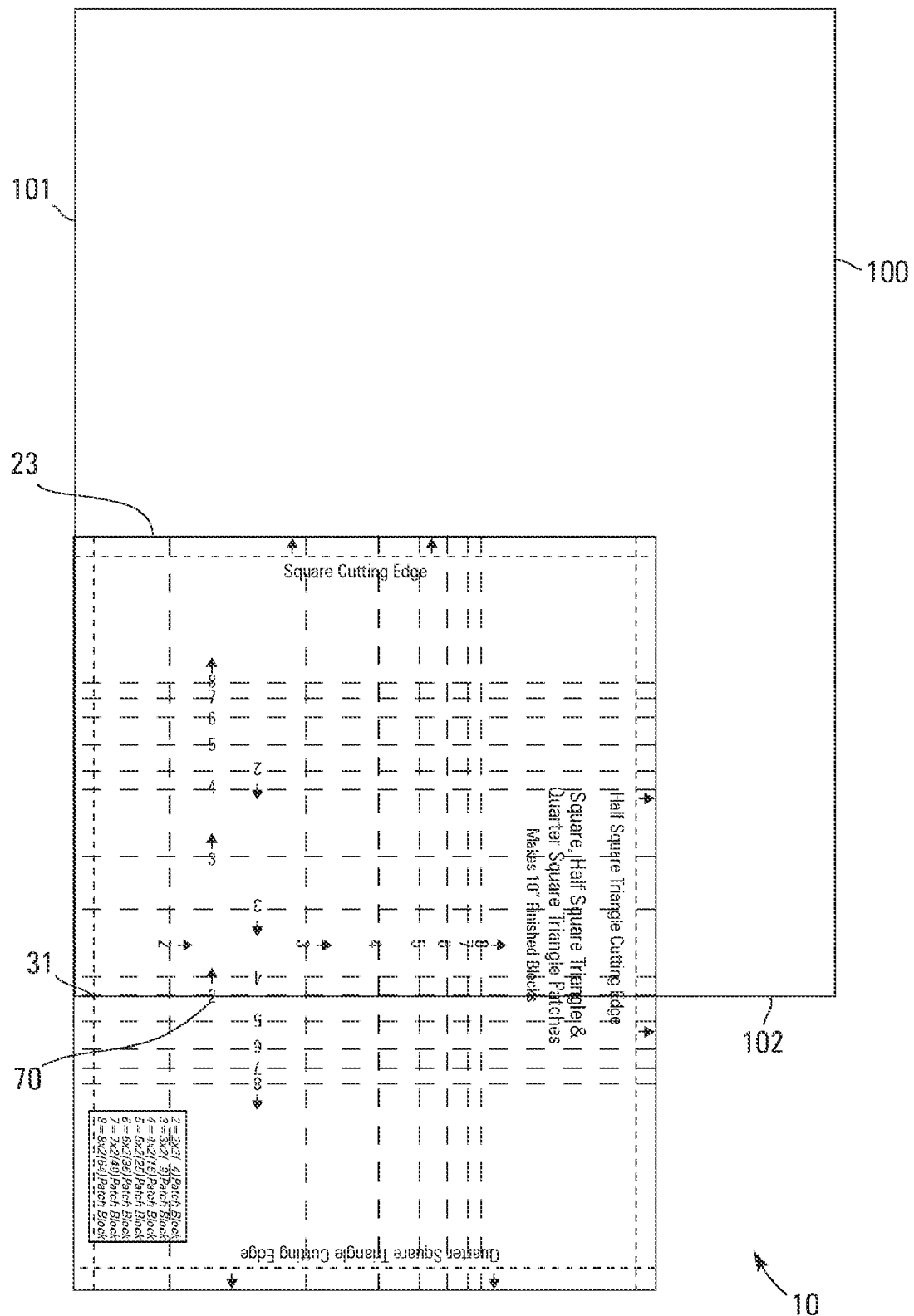
FIG. 2 is a reduced plan view of the quilting tool in FIG. 1 with the second major surface contacting a piece of material.
Figure 3:
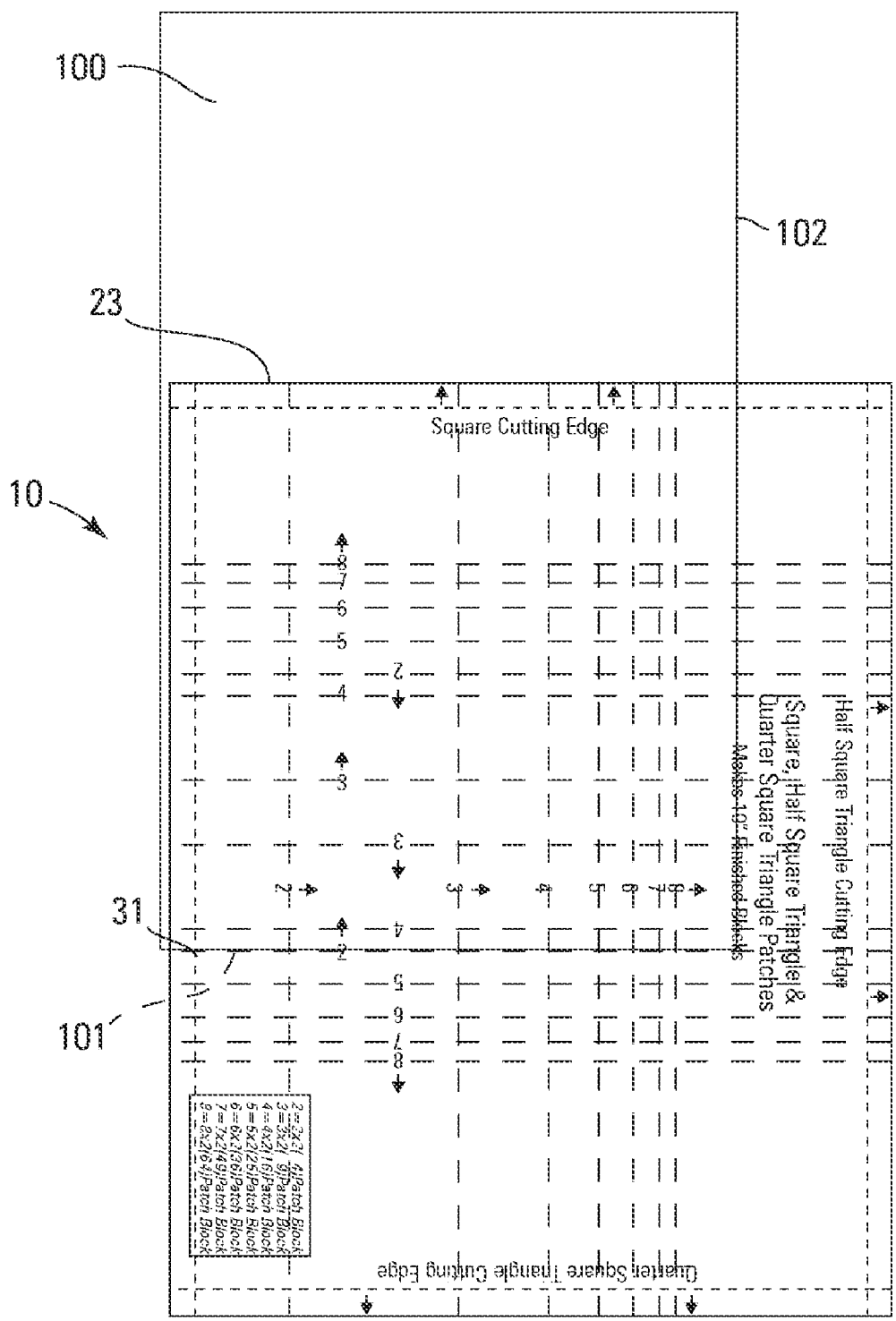
FIG. 3 is the quilting tool in FIG. 2 in contact with the cut piece of fabric rotated 90 degrees counterclockwise relative to the quilting tool.

FB is the finished block 300 edge length. NP is the number of patches 110 wanted along the FB. SA is the seam allowance. The guidelines 30 may be imprinted on the plate 20 as solid lines or preferably broken lines as shown in FIGS. 1-3.

The SA may be any suitable seam allowance SA. Typically a 0.25 inch seam allowance SA is used in quilting. The remainder of the discussion will be based on a 0.25 inch seam allowance SA.

The spacing of the first set of guidelines 30 on the plate 20 depends on the finished block 300 size the quilting tool 10 is designed to produce. For example, as shown in FIG. 1, a quilting tool 10 designed to produce patches 110 to make a ten inch finished block 300 edge length FB with a 0.25 inch seam allowance SA and an NP ranging from 2 to 8 would have a first set of guidelines 30 spaced from the first side 23 as follows:

TABLE 1

| NP | Guideline Label | Distance from First Side in Inches |
|----|-----------------|-------------------------------------|
| 2  | 2               | 5.50                                |
| 3  | 3               | 3.83                                |
| 4  | 4               | 3.00                                |
| 5  | 5               | 2.50                                |
| 6  | 6               | 2.17                                |
| 7  | 7               | 1.93                                |
| 8  | 8               | 1.75                                |

The first set of guidelines 30 may have as many individual guidelines as may fit on the plate 20. Preferably the first set of guidelines 30 has seven individual guidelines corresponding to NPs from 2 through 8 and spaced from the first side 23 as shown in Table 1. The first set of guidelines 30 may be labeled with alphanumeric characters 70 to allow the user (not shown) of the quilting tool 10 to easily determine the proper individual guideline to use. Preferably the alphanumeric character 70 corresponds to the number of patches 110 (NP) wanted along the finished block 300 edge length FB.

As shown in FIG. 1, the preferred first individual guideline 31 is for an NP of 2 and labeled with the alphanumeric character 70 "2" and an arrow pointing toward the first side 23. The second individual guideline 32 is for an NP of 3 and labeled with a "3" and an arrow pointing toward the first side 23. The third individual guideline 33 is for an NP of 4 and labeled with a "4" and an arrow pointing toward the first side 23. The fourth individual guideline 34 is for an NP of 5 and labeled with a "5" and an arrow pointing toward the first side 23. The fifth individual guideline 35 is for an NP of 6 and labeled with a "6" and an arrow pointing toward the first side 23. The sixth individual guideline 36 is for an NP of 7 and labeled with a "7" and an arrow pointing toward the first side 23. The seventh individual guideline 37 is for an NP of 8 and labeled with an "8" and an arrow pointing toward the first side 23.

The quilting tool 10 may also display the seam allowance SA by having seam allowance SA guidelines 60 imprinted on the plate 20. As shown in FIG. 1, the plate 20 may have a first seam allowance SA guideline 60 parallel to the first side 23 and spaced from the first side 23 by the distance SA. A second seam allowance SA guideline 60 may also be place parallel to the second side 24 and spaced a distance of SA from the second side 24. A third seam allowance SA guideline 60 may also be place parallel to the third side 25 and spaced a distance of SA from the third side 25. A fourth seam allowance SA guideline 60 may also be place parallel to the fourth side 26 and spaced a distance of SA from the fourth side 26. The seam allowance SA guidelines 60 may be visually distinct from the first set of guidelines 30.

The plate 20 may also be imprinted with the label "Square Cutting Edge" proximate the first side 23. This label may allow the user of the quilting tool 10 to easily find the first side 23 of the tool 10 and to properly orient the tool 10 upon a piece of fabric 100 to cut the patches 110 for a square quilt design.

A second embodiment of the quilting tool 10 comprises a transparent, parallelogram plate 20 and a second set of guidelines 40. The plate 20 has a least a first major surface 21, a second major surface 22, a first side 23, a second side 24, a third side 25, and a fourth side 26. The first side 23 is parallel to the second side 24. The third side 25 is parallel to the fourth side 26.

The second set of guidelines 40 may be affixed to the first major surface 21 or second major surface 22 of the plate 20. The second set of guidelines 40 is preferably affixed to the first major surface 21 of the plate 20. The second set of guidelines 40 may be affixed to the plate 20 by any suitable means such as inking, etching, adhesive, chemical, or imprinting. The preferred method is imprinting.

The second set of guidelines 40 is parallel to the third side 25 and extends from proximate the first side 23 to the second side 24 of the plate 20. The second set of guidelines 40 is spaced from the third side 25 to allow the creation of a patch 110 that can be cut into half square triangle 120 patches 110 to be used to form a block 200 with a given finished block 300 edge length FB. The second set of guidelines 40 is spaced from the third side 25 of the plate 20 based on the equations:

$$[(FB/NP)+(2 \times SA)]^2 = R1$$

$$[\sqrt{(R1 \times 2)}]+(2 \times SA) = R2$$

$$\sqrt{(R2^2/2)}$$

FB is the finished block 300 edge length. NP is the number of patches 110 wanted along the FB. SA is the seam allowance. R1 is the first result used in the second equation and R2 is the second result used in the third equation. The guidelines 40 may be imprinted on the plate 20 as solid lines or preferably broken lines as shown in FIGS. 1-3.

The spacing of the second set of guidelines 40 on the plate 20 depends on the finished block 300 size the quilting tool 10 is designed to produce. For example, as shown in FIG. 1, a quilting tool 10 designed to produce patches 110 to make a ten inch finished block 300 edge length FB with a 0.25 inch seam allowance SA and an NP ranging from 2 to 8 would have a second set of guidelines 40 spaced from the third side 25 as follows:

TABLE 2

| NP | Guideline Label | Distance from Thrid Side in Inches |
|----|----|----|
| 2 | 2 | 5.85 |
| 3 | 3 | 4.19 |
| 4 | 4 | 3.35 |
| 5 | 5 | 2.85 |
| 6 | 6 | 2.52 |
| 7 | 7 | 2.28 |
| 8 | 8 | 2.10 |

The second set of guidelines 40 may have as many individual guidelines as may fit on the plate 20. Preferably the second set of guidelines 40 has seven individual guidelines corresponding to NPs from 2 through 8 and spaced from the third side 25 as shown in Table 2. The second set of guidelines 40 may be labeled with alphanumeric characters 70 to allow the user of the quilting tool 10 to easily determine the proper individual guideline to use. Preferably the alphanumeric character 70 corresponds to the number of patches 110 wanted along the finished block 300 edge length FB.

As shown in FIG. 1, the preferred first individual guideline 41 for the second set of guidelines 40 is for an NP of 2. The first individual guideline 41 may be labeled with an alphanumeric character 70 to designate the NP for which it correlated. As shown in FIG. 1, the first individual guideline 41 is labeled with a "2" and an arrow pointing toward the third side 25. The second individual guideline 42 is for an NP of 3 and labeled with a "3" and an arrow pointing toward the third side 25. The third individual guideline 43 is for an NP of 4 and labeled with a "4" and an arrow pointing toward the third side 25. The fourth individual guideline 44 is for an NP of 5 and labeled with a "5" and an arrow pointing toward the third side 25. The fifth individual guideline 45 is for an NP of 6 and labeled with a "6" and an arrow pointing toward the third side 25. The sixth individual guideline 46 is for an NP of 7 and labeled with a "7" and an arrow pointing toward the third side 25. The seventh individual guideline 47 is for an NP of 8 and labeled with an "8" and an arrow pointing toward the third side 25.

The plate 20 may also be imprinted with the label "Half Square Triangle Cutting Edge" proximate the third side 25. This label may allow the user of the quilting tool 10 to easily find the third side 25 of the tool 10 and to properly orient the tool 10 upon a piece of fabric 100 to cut the patches 110 for a half square triangle 120 quilt design.

As shown in FIG. 1, the second set of guidelines 40 may be imprinted on the same plate 20 as the first set of guidelines 30 to allow the quilting to be multi-functional. When the first set of guidelines 30 is imprinted onto the same plate 20 as the second set of guidelines 40, preferably the alphanumeric characters 70 for the first set of guidelines 30 and the second set of guidelines 40 may be imprinted in different colors to allow the user to easily locate the set first set of guidelines 30 or the second set of guidelines 40.

A third embodiment of the quilting tool 10 comprises a transparent, parallelogram plate 20 and a third set of guidelines 50. The plate 20 has a least a first major surface 21, a second major surface 22, a first side 23, a second side 24, a third side 25, and a fourth side 26. The first side 23 is parallel to the second side 24. The third side 25 is parallel to the fourth side 26.

The third set of guidelines 50 may be affixed to the first major surface 21 or second major surface 22 of the plate 20. The third set of guidelines 50 is preferably affixed to the first major surface 21 of the plate 20. The third set of guidelines 50 may be affixed to the plate 20 by any suitable means such as inking, etching, adhesive, chemical, or imprinting. The preferred method is imprinting.

The third set of guidelines 50 is parallel to the second side 24 and extends from proximate the third side 25 to the fourth side 26 of the plate 20. The third set of guidelines 50 is spaced from the second side 24 to allow the creation of a patch 110 that can be cut into quarter square triangle 130 patches 110 to be used to form a block 200 with a given finished block 300 edge length FB. The third set of guidelines 50 is spaced from the second side 24 of the plate 20 based on the equations:

$$[(FB/NP)+(2 \times SA)]^2 = R1$$

$$[\sqrt{(R1 \times 2)}]+(4 \times SA) = R2$$

$$\sqrt{(R2^2/2)}$$

FB is the finished block 300 edge length. NP is the number of patches 110 wanted along the FB. SA is the seam allowance. R1 is the first result used in the second equation and R2 is the second result used in the third equation. The guidelines may be imprinted on the plate 20 as solid lines or preferably broken lines as shown in FIGS. 1-3.

The spacing of the third set of guidelines 50 on the plate 20 depends on the finished block 300 size the quilting tool 10 is designed to produce. For example, as shown in FIG. 1, a quilting tool 10 designed to produce patches 110 to make a ten inch finished block 300 edge length FB with a 0.25 inch seam allowance SA and an NP ranging from 2 to 8 would have a third set of guidelines 50 spaced from the second side 24 as follows:

TABLE 3

| NP | Guideline Label | Distance from Second Side in Inches |
|---|---|---|
| 2 | 2 | 6.21 |
| 3 | 3 | 4.54 |
| 4 | 4 | 3.71 |
| 5 | 5 | 3.21 |
| 6 | 6 | 2.87 |
| 7 | 7 | 2.64 |
| 8 | 8 | 2.46 |

The third set of guidelines 50 may have as many individual guidelines as may fit on the plate 20. Preferably the third set of guidelines 50 has seven individual guidelines corresponding to NPs from 2 through 8 and spaced from the second side 24 as shown in Table 3. The third set of guidelines 50 may be labeled with alphanumeric characters 70 to allow the user of the quilting tool 10 to easily determine the proper individual guideline to use. Preferably the alphanumeric character 70 corresponds to the number of patches 110 wanted along the finished block 300 edge length FB.

As shown in FIG. 1, the preferred first individual guideline 51 for the third set of guidelines 50 is for an NP of 2. The first individual guideline 51 may be labeled with an alphanumeric character 70 to designate the NP for which it correlated. As shown in FIG. 1, the first individual guideline 51 is labeled with a "2" and an arrow pointing toward the second side 24. The second individual guideline 52 is for an NP of 3 and labeled with a "3" and an arrow pointing toward the second side 24. The third individual guideline 53 is for an NP of 4 and labeled with a "4" and an arrow pointing toward the second side 24. The fourth individual guideline 54 is for an NP of 5 and labeled with a "5" and an arrow pointing toward the second side 24. The fifth individual guideline 55 is for an NP of 6 and labeled with a "6" and an arrow pointing toward the second side 24. The sixth individual guideline 56 is for an NP of 7 and labeled with a "7" and an arrow pointing toward the second side 24. The seventh individual guideline 57 is for an NP of 8 and labeled with an "8" and an arrow pointing toward the second side 24.

The plate 20 may also be imprinted with the label "Quarter Square Triangle Cutting Edge" proximate the second side 24. This label may allow the user of the quilting tool 10 to easily find the second side 24 of the tool 10 and to properly orient the tool 10 upon a piece of fabric 100 to cut the patches 110 for a quarter square triangle 130 quilt design.

As shown in FIG. 1, the third set of guidelines 50 may be imprinted on the same plate 20 as the first set of guidelines 30 and second set of guidelines 40 to allow the quilting tool 10 to be multi-functional. When the first set of guidelines 30, the second set of guidelines 40, and third set of guidelines 50 are imprinted on the same plate 20, preferably the alphanumeric characters 70 for the first set of guidelines 30, the second set of guidelines 40, and the third set of guidelines 50 are imprinted in different colors to allow the user to easily locate the first set of guidelines 30, the second set of guidelines 40, and the third set of guidelines 50.

A multitude of quilting tool 10s may be made to accommodate different finished block 300 edge lengths FB or seam allowances SA by inserting the proper numbers in the equations to determine the proper placement of the first set of guidelines 30, second set of guidelines 40, and/or third set of guidelines 50. The scope of this invention should not be limited to the finished block 300 edge length FB used in the example. The invention may also be used for both imperial measurements as well as metric measurements.

Use

Figure 5:
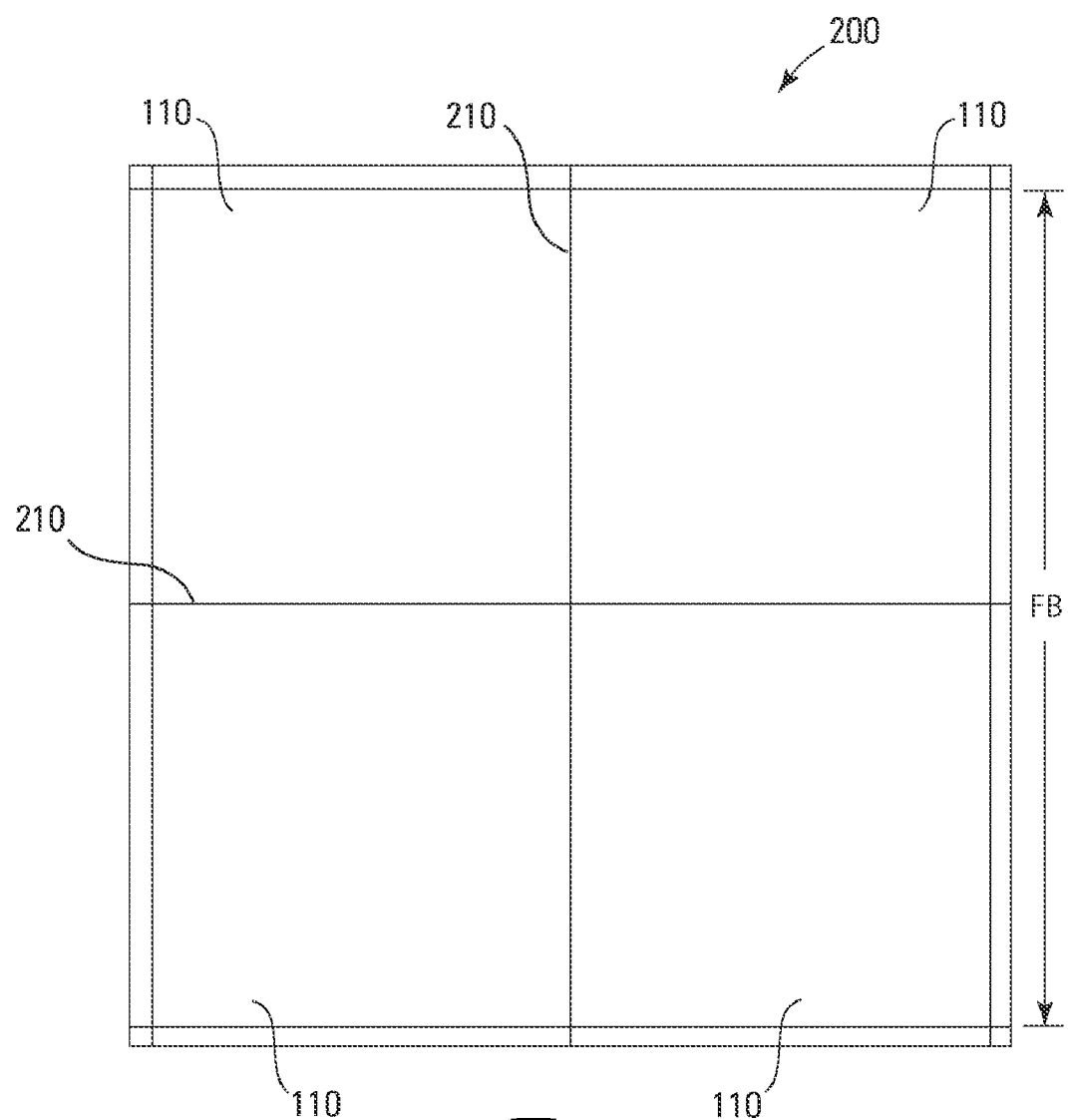
FIG. 5 is a plan view of a block using the patch from FIG. 3 and three additional identical patches.
Figure 5A:
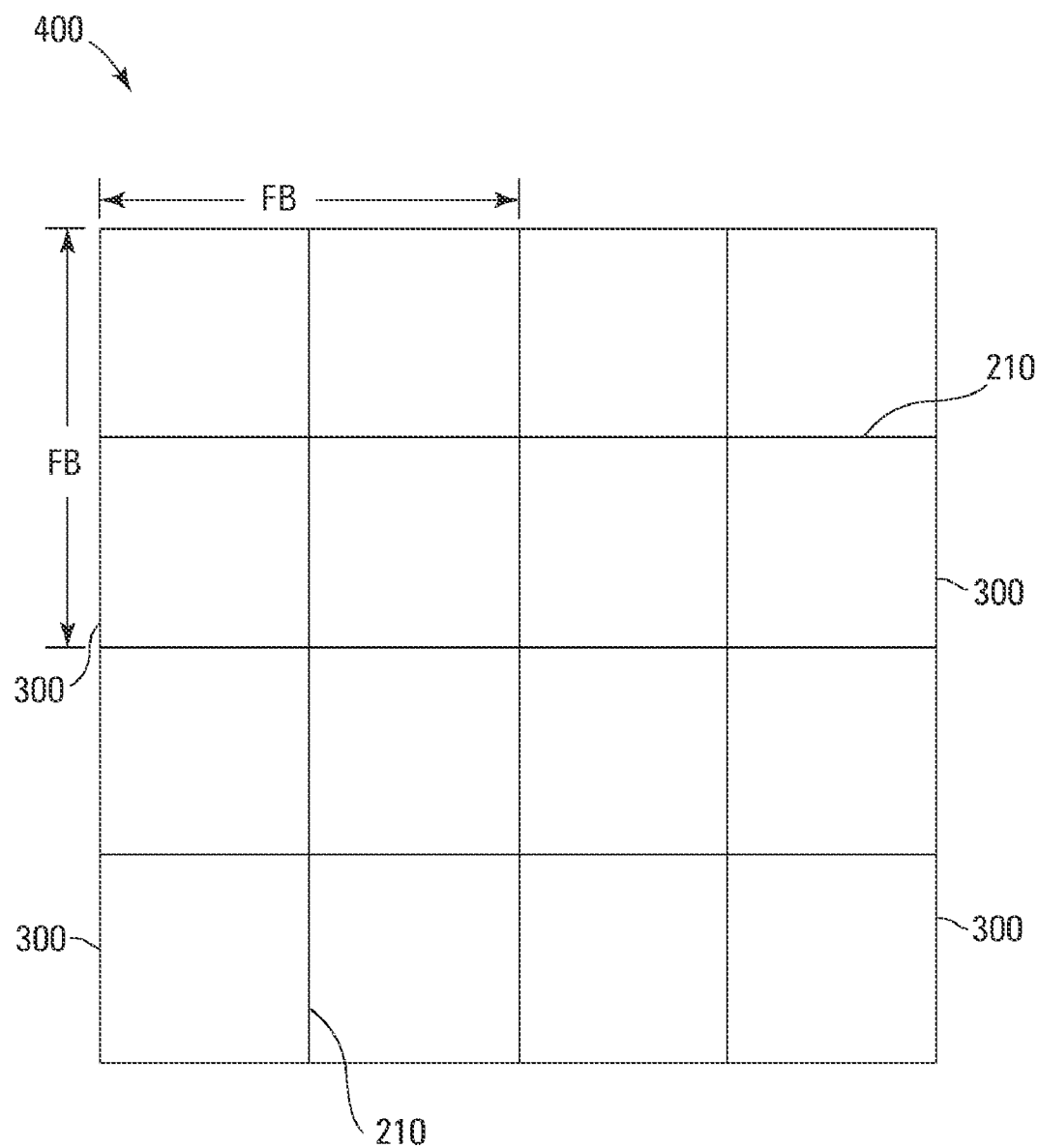
FIG. 5A is a reduced plan view of a quilt made from the block of FIG. 5 and three identical blocks.

The present claimed invention is used to create fabric blocks 200 by combining two or more patches 110 which may or may not be cut from different colors, designs or types of fabric. The fabric blocks 200 may then be assembled together to form a finished block 300 as shown in FIG. 5. The finished blocks 300 may then be assembled to form a quilt 400 as shown in FIG. 5A. A first method of use of the present claimed invention involves obtaining a piece of fabric 100 having at least one edge (not numbered). The piece of fabric 100 may then be placed on a suitable cutting surface (not numbered).

The quilting tool 10 it then placed so as to overlay the piece of fabric 100 such that the second major surface 22 of the tool 10 is in contact with the piece of fabric 100. To make a square patch 110 the first embodiment of the quilting tool 10 may be used. The quilting tool 10 is aligned over the piece of fabric 100 such that the individual guideline corresponding to the appropriate NP of the tool 10 is aligned with the edge of the piece of fabric 100. For example, as shown in FIG. 2, the first guideline 31 (for an NP of 2) of the quilting tool 10 is aligned with the edge of the piece of fabric 100. The piece of fabric 100 may then be cut along the first side 23 (labeled Square Cutting Edge) of the quilting tool 10 producing a cut piece of fabric 100.

As shown in FIG. 3, the cut piece of fabric 100 may then be rotated ninety degrees. The quilting tool 10 is then placed so as to overlay the cut piece of fabric 100 such that the second major surface 22 of the tool 10 is in contact with the cut piece of fabric 100. The quilting tool 10 is then aligned over the cut piece of fabric 100 such that the fourth side 26 of the tool 10 is aligned with the edge of the cut piece of fabric 100 and the first individual guideline 31 completely overlays the cut piece of fabric 100. The cut piece of fabric 100 is then cut again along the first side 23. The cut piece of fabric 100 is then rotated 180 degrees.

Figure 4:
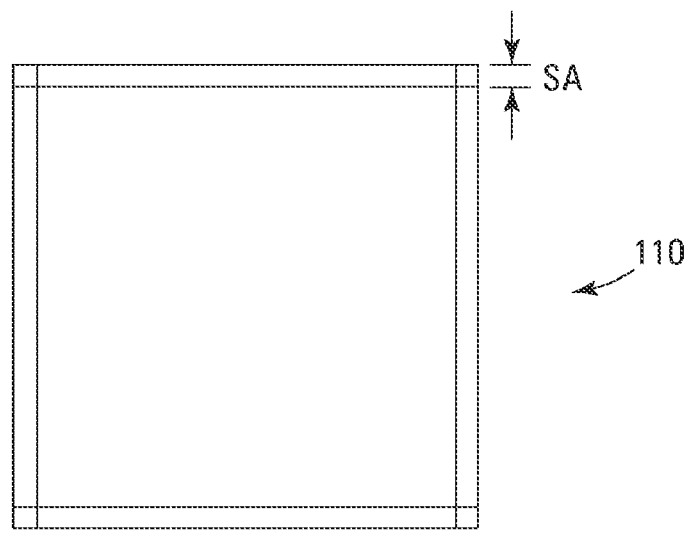
FIG. 4 is the resultant patch from FIG. 3.

The quilting tool 10 is then placed so as to overlay the cut piece of fabric 100 such that the second major surface 22 of the tool 10 is in contact with the cut piece of fabric 100. The quilting tool 10 is then aligned over the cut piece of fabric 100 such that the first individual guideline 31 is aligned along last cut edge of the cut piece of fabric 100. The cut piece of fabric 100 is then cut again along the first side 23. As shown in FIG. 4, the result is a square patch 110 with the desired edge length (not numbered). The steps may then be repeated to make additional patches 110 of the same size to be sewn together to make a block 200 of the appropriate size.

For example, a quilting tool 10 designed to make square patches 110 for a 10 inch finished block 300 edge length FB may have a first individual guideline spaced 31 from the first side 23 of the plate 20 5.50 inches for an NP of 2 as shown in table 1. An NP of 2 means the 10 inch finished block 200 will have two patches 110 along on edge for a total of four patches 110. The above steps are followed to make at least four patches 110 with the appropriate seam allowance SA along each edge of the patches 110. The four patches 110 may then be sewn together to form a square block 200 as shown in FIG. 5. As the four patches 110 all had a seam allowance SA along each edge, the block 200 also has an appropriate seam allowance SA along each edge of the block 200 without having to calculate the exact edge length of each patch 110. The block 200 may then be assembled with additional blocks 200 of the same size to form a quilt 400. An example is the quilt 400 shown in FIG. 5A where 4 blocks 200 were assembled by sewing along the seam allowances SA of each block 200. The quilt 400 has four finished blocks 300 each with the proper edge length FB.

A second method of use of the present claimed invention involves obtaining a piece of fabric 100 having at least a first edge 101 and second edge 102 intersecting the first edge 101 at a ninety degree angle. The piece of fabric 100 may then be placed on a suitable cutting surface.

The quilting tool 10 it then placed so as to overlay the piece of fabric 100 such that the second major surface 22 of the tool 10 is in contact with the piece of fabric 100. To make a square patch 110 the first embodiment of the quilting tool 10 may be used. The quilting tool 10 is aligned over the piece of fabric 100 such that the fourth side 26 of the plate 20 is aligned with the first edge 101 of the piece of fabric 100 and the individual guideline corresponding to the appropriate NP of the tool 10 is aligned with the second edge 102 of the piece of fabric 100. For example, as shown in FIG. 2, the first guideline 31 (for an NP of 2) of the quilting tool 10 is aligned with the second edge 102 of the piece of fabric 100. The piece of fabric 100 may then be cut along the first side 23 (labeled Square Cutting Edge) of the quilting tool 10 producing a cut piece of fabric 100.

As shown in FIG. 3, the cut piece of fabric 100 may then be rotated ninety degrees counterclockwise. The quilting tool 10 is then placed so as to overlay the cut piece of fabric 100 such that the second major surface 22 of the tool 10 is in contact with the cut piece of fabric 100. The quilting tool 10 is then aligned over the cut piece of fabric 100 such that the fourth side 26 of the tool 10 is aligned with the newly cut edge of the cut piece of fabric 100 and the first individual guideline 31 is aligned along the first edge 101 of the cut piece of fabric 100. The cut piece of fabric 100 is then cut again along the first side 23. As shown in FIG. 4, the result is a square patch 110 with the desired edge length. The steps may then be repeated to make additional patches 110 of the same size to be sewn together to make a block 200 of the appropriate size.

A third method of use of the present claimed invention involves obtaining a piece of fabric 100 having at least a first edge 101 and second edge 102 intersecting at a ninety degree angle and having a width equal to the desired distance from the first side 23 of the plate 20 to the desired individual guideline. The piece of fabric 100 may then be placed on a suitable cutting surface.

The quilting tool 10 it then placed so as to overlay the piece of fabric 100 such that the second major surface 22 of the tool 10 is in contact with the piece of fabric 100. To make a square patch 110 the first embodiment of the quilting tool 10 may be used. The quilting tool 10 is aligned over the piece of fabric 100 such that the fourth side 26 of the plate 20 is aligned with the first edge 101 of the piece of fabric 100 and the individual guideline corresponding to the appropriate NP of the tool 10 is aligned with the second edge 102 of the piece of fabric 100. The piece of fabric 100 may then be cut along the first side 23 (labeled Square Cutting Edge) of the quilting tool 10 producing a cut piece of fabric 100. The result is a square patch 110 with the desired edge length. The steps may then be repeated to make additional patches 110 of the same size to be sewn together to make a block 200 of the appropriate size.

Figure 6:
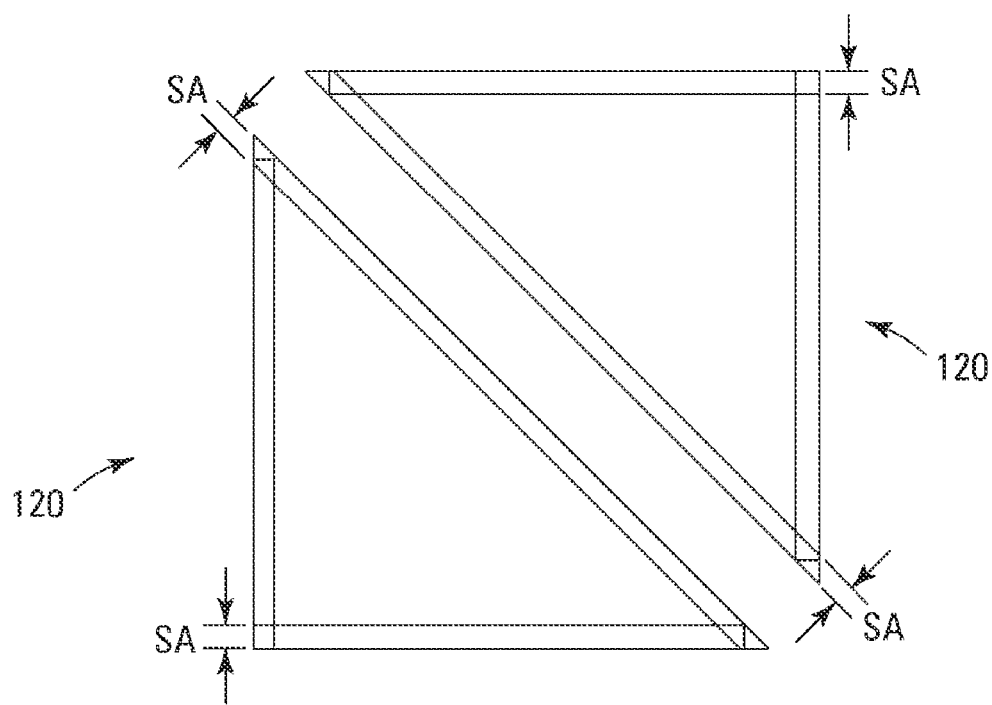
FIG. 6 is a plan view of a reduced patch cut using a second set of guidelines imprinted on the quilting tool in FIG. 1 and cut diagonally from one corner to the diametrically opposed corner to make two equal triangles.
Figure 7:
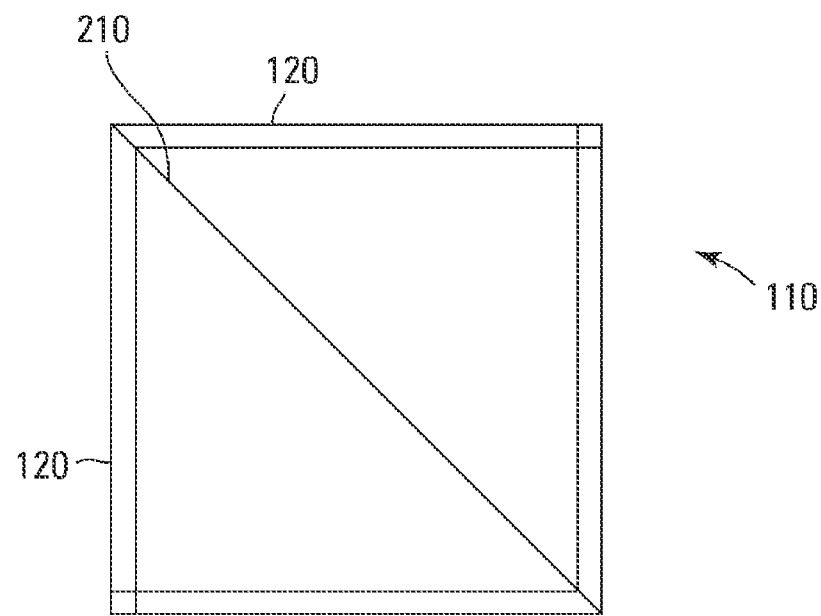
FIG. 7 is a plan view of a patch sewn together using the two triangle in FIG. 6.

All three above methods of use may also be used with the second set of guidelines 40 or the third set of guidelines 50. Using the second set of guidelines 40 produces square patches 110 that may then be cut in half from one corner to the diametrically opposed corner to produce two equally sized triangles as shown in FIG. 6. The size of the patch 110 before cutting to make triangles allows for an additional seam allowance SA to sew the triangles together to make a new patch 110 as shown in FIG. 7 with a seam 210 running from one corner (not numbered) to the diametrically opposed corner (not numbered) of the patch 110.

Figure 8:
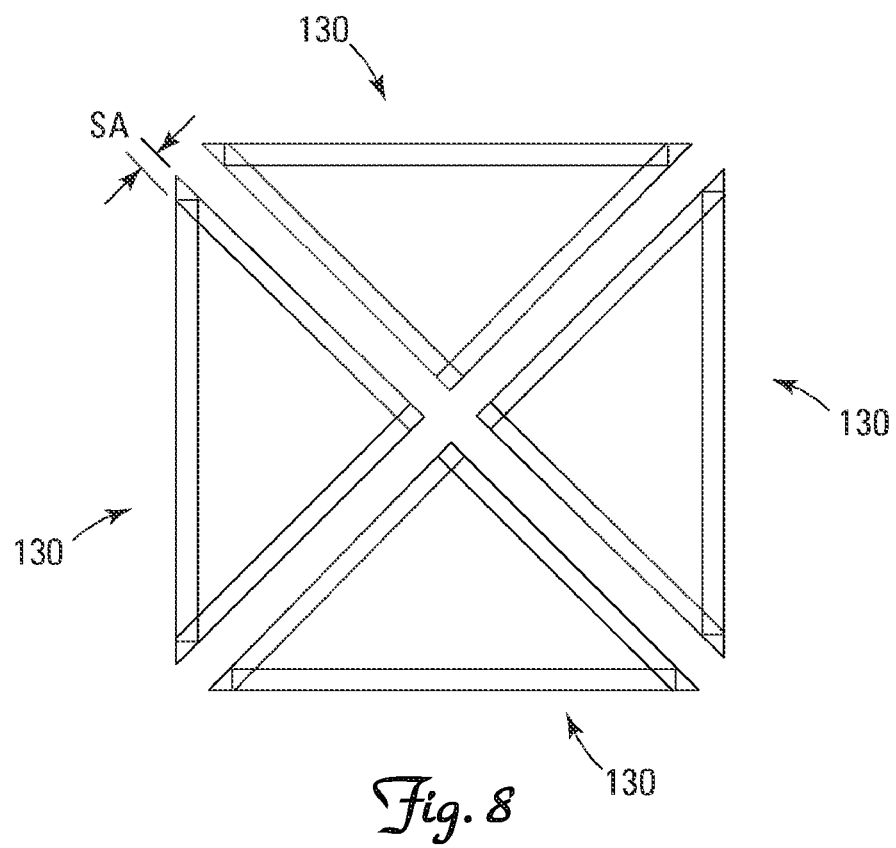
FIG. 8 is a plan view of a reduced patch cut using a third set of guidelines imprinted on the quilting tool in FIG. 1 and cut to make four equally sized triangles.
Figure 9:
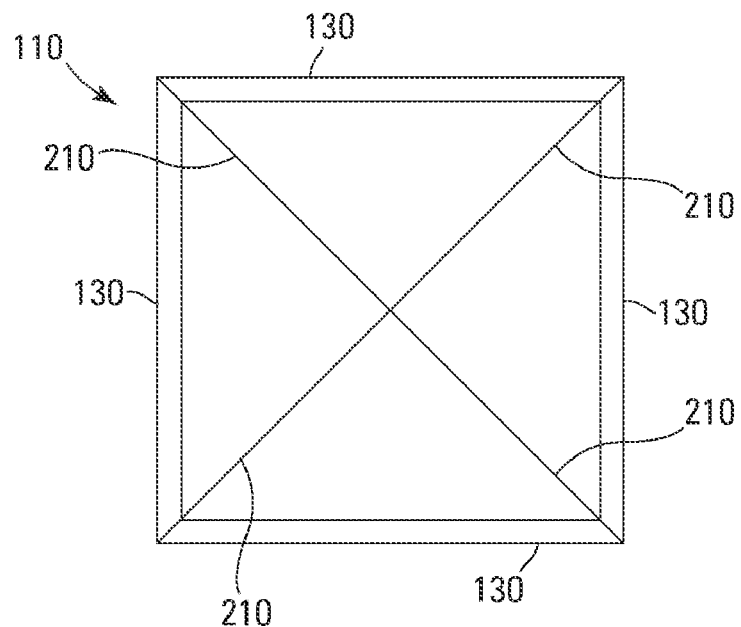
FIG. 9 is a plan view of a patch sewn together using the four triangle in FIG. 8.

Using the third set of guidelines 50 produces square patches 110 that may then be cut in half from one corner to the diametrically opposed corner to produce two equally sized triangles and then the resulting triangles are again cut in half to produce four equally sized triangles as shown in FIG. 8. The size of the patch 110 before cutting to make triangles allows for an additional seam allowance SA to sew the triangles together to make a new patch 110 as shown in FIG. 9 with a first seam 210 running from a first corner (not numbered) to the diametrically opposed corner (not numbered) of the patch 110 and a second seam 210 running from the second corner (not numbered) lying in the same plane as the first corner to the second corner's diametrically opposed corner (not numbered) of the patch 110.

I claim:

1. A quilting tool, comprising:
   (a) a transparent, parallelogram plate having at least,
      (i) a first major surface,
      (ii) a second major surface,
      (iii) a first side
      (iv) a second side parallel to the first side,
      (v) a third side, and
      (vi) a fourth side parallel to the third side; and
   (b) a set of guidelines, having at least a plurality of individual guidelines, imprinted on the first major surface of the plate wherein the individual guidelines are (i) parallel to the first side and extend from the third side to the fourth side and (ii) spaced from the first side based on (FB/NP)+(2×SA) wherein FB is the finished block edge length, NP is the number of patches wanted along FB, and SA is the seam allowance.

2. The quilting tool as recited in claim 1, wherein a seam allowance guideline is imprinted on the first major surface of the plate a distance of SA from the first side and parallel to the first side.

3. The quilting tool as recited in claim 1, wherein the plate is acrylic.

4. The quilting tool as recited in claim 1, wherein the plate is ⅛ inch thick.

5. The quilting tool as recited in claim 1, wherein the plate further includes a set of alphanumeric characters imprinted on the first major surface next to the respective individual guideline indicating the appropriate guideline to use for a particular NP.

6. The quilting tool, as recited in claim 5, wherein the alphanumeric character next to each individual guideline indicates the NP employed to determine the location of the respective individual guideline.

7. A method of using the quilting tool of claim 1, comprising the steps of:
   (a) obtaining a piece of fabric having at least a one edge;
   (b) placing the piece of fabric on a suitable cutting surface;
   (c) overlaying the quilting tool wherein the second major surface of the tool contacts the piece of fabric;
   (d) aligning the quilting tool over the piece of fabric such that the guideline corresponding to the appropriate NP is lying along the edge of the fabric; and
   (e) cutting the piece of fabric along the first side of the quilting tool.

8. A quilting tool, comprising:
   (a) a transparent, parallelogram plate having at least,
      (i) a first major surface,
      (ii) a second major surface,
      (iii) a first side
      (iv) a second side parallel to the first side,
      (v) a third side, and
      (vi) a fourth side parallel to the third side; and
   (b) a set of guidelines, having at least a plurality of individual guidelines, imprinted on the first major surface of the plate wherein the individual guidelines are (i) parallel to the third side and extend from the first side to the second side and (ii) spaced from the third side based on (1) $[(FB/NP)+(2\times SA)]^2 = R1$, (2) $[\sqrt{(R1\times 2)}]+(2\times SA)=R2$, (3) $\sqrt{(R2^2/2)}$ wherein FB is the finished block edge length, NP is the number of patches wanted along FB, SA is the seam allowance, R1 is the first result, and R2 is the second result.

9. The quilting tool as recited in claim 8, wherein a seam allowance guideline is imprinted on the first major surface of the plate a distance of SA from the third side and parallel to the third side.

10. The quilting tool as recited in claim 8, wherein the plate is acrylic.

11. The quilting tool as recited in claim 8, wherein the plate is ⅛ inch thick.

12. The quilting tool, as recited in claim 8, wherein the plate further includes a set of alphanumeric characters imprinted on the first major surface next to the respective individual guideline indicating the appropriate guideline to use for a particular NP.

13. The quilting tool, as recited in claim 12, wherein the alphanumeric character next to each individual guideline indicates the NP employed to determine the location of the respective individual guideline.

14. A quilting tool, comprising:
   (a) a transparent, parallelogram plate having at least,
      (i) a first major surface,
      (ii) a second major surface,
      (iii) a first side
      (iv) a second side parallel to the first side,
      (v) a third side, and
      (vi) a fourth side parallel to the third side; and
   (b) a set of guidelines, having at least a plurality of individual guidelines, imprinted on the first major surface of the plate wherein the individual guidelines (i) are parallel to the second side and extend from the third side to the fourth side and (ii) are spaced from the second side based on (1) $[(FB/NP)+(2\times SA)]^2=R1$, (2) $[\sqrt{(R1\times 2)}]+(4\times SA)=R2$, (3) $\sqrt{(R2^2/2)}$ wherein FB is the finished block edge length, NP is the number of patches wanted along FB, SA is the seam allowance, R1 is the first result, and R2 is the second result.

15. The quilting tool as recited in claim 14, wherein a seam allowance guideline is imprinted on the first major surface of the plate a distance of SA from the second side and printed parallel to the second side.

16. The quilting tool as recited in claim 14, wherein the plate is acrylic.

17. The quilting tool as recited in claim 14, wherein the plate is ⅛ inch thick.

18. The quilting tool, as recited in claim 14, wherein the plate further includes a set of alphanumeric characters imprinted on the first major surface next to the respective individual guideline indicating the appropriate guideline to use for a particular NP.

19. The quilting tool, as recited in claim 18, wherein the alphanumeric character next to each individual guideline indicates the NP employed to determine the location of the respective individual guideline.

* * * * *